US006574373B1

(12) United States Patent
Morba et al.

(10) Patent No.: US 6,574,373 B1
(45) Date of Patent: Jun. 3, 2003

(54) METHOD AND APPARATUS FOR PRINTING DIGITAL IMAGES

(75) Inventors: Michael A. Morba, Rochester, NY (US); Charles W. Hicks, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/249,573
(22) Filed: Feb. 12, 1999
(51) Int. Cl.[7] .............................................. G03B 27/32
(52) U.S. Cl. ...................................... 382/254; 382/260
(58) Field of Search ................................. 382/254–269

(56) References Cited

U.S. PATENT DOCUMENTS

| 5,469,209 A | 11/1995 | Gunday et al. ............... 348/96 |
| 6,079,885 A | * 6/2000 | Sano ........................... 400/61 |

FOREIGN PATENT DOCUMENTS

| EP | 890 870 | 1/1999 |
| JP | 10200778 | * 7/1998 |

* cited by examiner

Primary Examiner—Thomas D. Lee
Assistant Examiner—Stephen Brinich
(74) Attorney, Agent, or Firm—Frank Pincelli; David A. Novais

(57) ABSTRACT

A method and apparatus for printing a customer image order, each containing a plurality of images. A digital record of a customer order containing a plurality of images is obtained. Digital enhancement is made to at least one of the plurality of images. The amount of digital enhancement made to each of the images enhanced is determined and a rating based on the amount of correction made to each image is obtained. The customer image order is printed with at least one enhancement print and one without any enhancement so that they can be compared.

38 Claims, 3 Drawing Sheets

METHOD AND APPARATUS FOR PRINTING DIGITAL IMAGES

FIELD OF THE INVENTION

The present invention relates to digital printing, and more particularly, the printing of digital images onto a photosensitive media.

BACKGROUND OF THE INVENTION

With the advent of digital printing onto photosensitive material many more opportunities are provided for improving the quality of the output of the image. This is particularly important wherein images are produced by printing images on a photographic media such as photographic film. In prior art optical printers of photographic film, color adjustments are typically made to the exposure light in order to correct for color balance. With the advent of digital printing, various other enhancements and/or corrections may be provided for printing of images from film so as to compensate for poor flash or lighting during taking of the image by the camera, or other flaws caused by the camera or picture taker. Use of a digital printer also allows enhancements in sharpness and dust and scratch removal. However, with all these improvements, it is sometimes very difficult for the actual consumer to know and appreciate the benefit being provided to the consumer.

Therefore, it is desirable to provide a method and apparatus whereby the consumer can more readily appreciate advantages provided by enhanced printing techniques used in printing of the images.

SUMMARY OF THE INVENTION

In accordance with one aspect of the present invention there is provided a method of printing a customer image order each containing a plurality of images, comprising the steps of:

obtaining a digital record of a customer order containing a plurality of images;

digitally enhancing at least one of the plurality of images;

determining the amount of digital enhancement made to each of the images enhanced and providing a rating based on the amount of correction provided and determining the image having the highest rated image enhancement;

printing of the images in accordance with the enhancement determined for each of the images; and printing one of the customer orders having a predetermined amount of enhancement without any of the enhancements so as to provide a comparison print illustrating how the image would have been printed without the enhancements.

In accordance with another aspect of the present invention, there is provided an apparatus for printing customer image orders, each containing a plurality of images, comprising:

a device for obtaining a digital record containing a plurality of images of a customer image order;

a memory for at least temporarily storing the plurality of images;

means for digitally enhancing at least one of the plurality of images;

means for determining the amount of enhancement made to each of the images enhanced and providing a rating based on the amount of correction provided; and a digital printer for printing the plurality of images of the customer which have been digitally enhanced and for printing a comparison print of the image having a predetermined amount of enhancement rating without the enhancement.

In accordance with yet another aspect of the present invention there is provided a computer program product, comprising a computer readable storage medium having a computer program stored thereon, which when loaded into a computer, causes the computer to perform the steps of:

analyzing images for a certain predetermined characteristics and then automatically digitally enhancing these features based on a predetermined criteria;

forwarding the enhanced images to a printer for printing;

determining an enhancement rating for each of the images of the customer order; and printing the image have a predetermined amount of enhancement.

In accordance with still another aspect of the present invention there is provided a method of printing a customer image order, each containing a plurality of images, comprising the steps of:

obtaining a digital record of a customer order containing a plurality of images;

determining the amount of enhancement that can be made to each of the images enhanced and providing a rating based on the amount of correction provided;

printing of the images as originally provided; and printing one of the images the customers order with enhancements so as to provide a comparison print illustrating how the image would have been printed with the enhancements.

In accordance with another aspect of the present invention there is provided an apparatus for printing customer image orders, each containing a plurality of images, comprising:

a device for obtaining a digital record of a plurality of images for a customer image order;

a memory for at least temporarily storing the plurality of images;

means for determining the amount of enhancement that can be made to each of the images enhanced and providing a rating based on the amount of correction that may be provided; and a digital printer for printing the plurality of images of the customer as originally provided and for printing a comparison print of an image from the plurality of images with enhancements which has a rating of predetermined amount.

In accordance with yet another aspect of the present invention there is provided a computer program product, comprising a computer readable storage medium having a computer program stored thereon, which when loaded into a computer, causes the computer to perform the steps of:

analyzing digital images in a customer image order to determine which image would most benefit from applying digital enhancing algorithms and rating each as to the amount of enhancement that can be made;

forwarding the images as originally provided to a printer for printing; and printing a comparison print of one of the plurality of images with enhancement, the comparison print having a rating of a predetermined amount.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed, in particular, to elements forming part of, or in cooperation more directly with, the apparatus in accordance with the present invention, it being understood that elements not specifically shown or described may take various forms well known to those skilled in the art.

Figure 1:
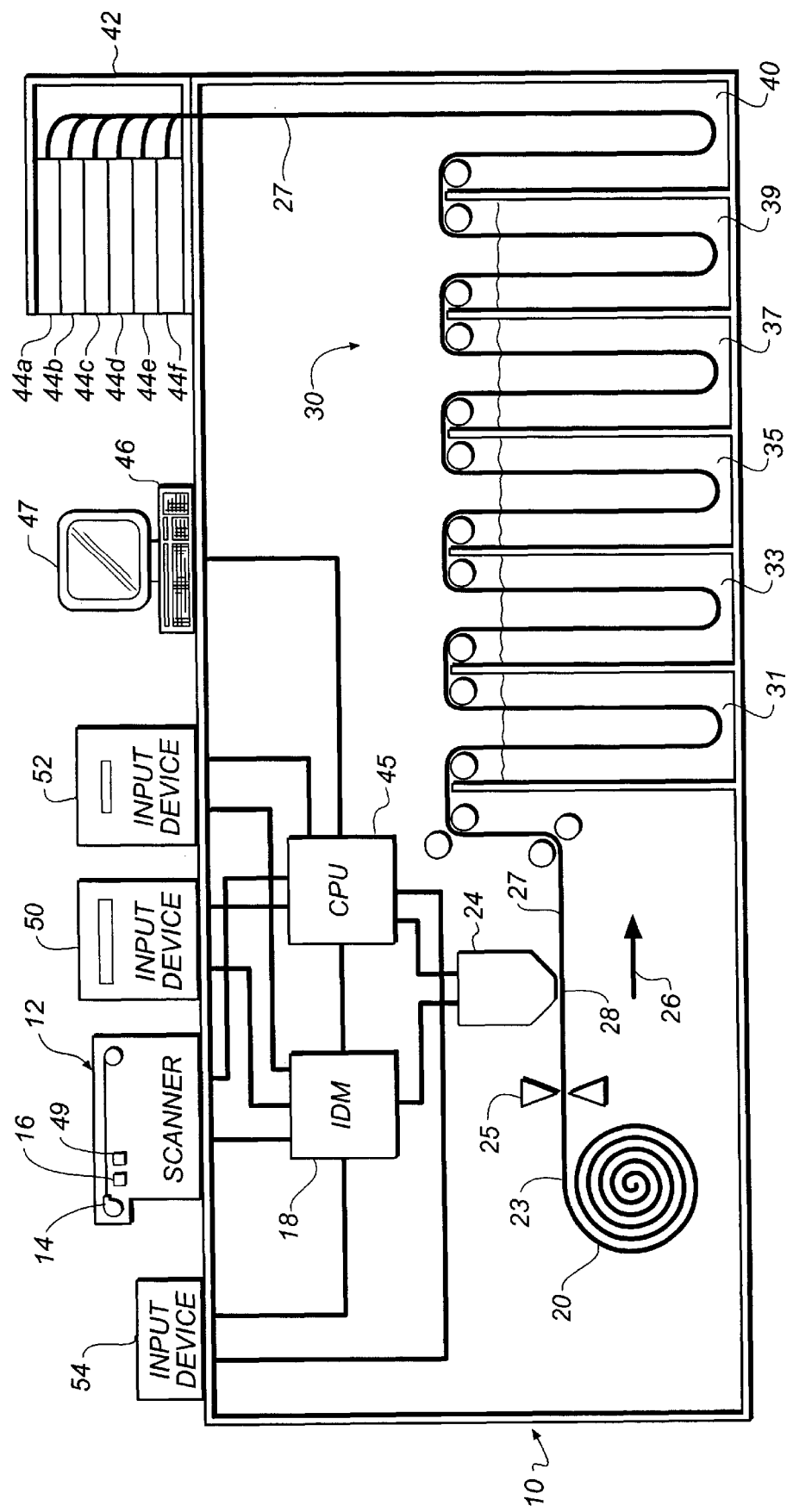
FIG. 1 is a schematic view of an apparatus made in accordance with the present invention.

Referring to FIG. 1, there is illustrated an apparatus 10 made in accordance with the present invention. In particular, the apparatus 10 is an apparatus designed to print digital images onto a photosensitive media (material). In particular, the apparatus 10 is of the type commonly referred to as a photographic minilab. As is typical with most minilabs, customer image orders are provided for printing of images onto a photosensitive media. A customer image order, for the purposes of the present invention, is a single roll of developed photographic film or digital record file of a single printing order containing a plurality of images thereon. In the particular embodiment illustrated, the apparatus 10 includes a scanner 12, which is designed to receive and scan a roll of developed film 14. The roll of developed film 14 is transported past sensor 16 in scanner 12 which scans the images on the film 14 so as to provide a digital record of the customer images. The scanner 12 scans at a resolution sufficient to provide the desired quality prints. The scanner should scan at a resolution of at least 500×700 pixels per inch, generally at least 1000×1500 pixels per inch. Preferably the scanner 12 scans at a high resolution equal to or greater than about 2000×3000 pixels per inch. The digital record of the image is forwarded to an image data manager (HDM) 18 wherein the images are manipulated as preprogrammed. In the embodiment illustrated, IDM 18 comprises a computer (microprocessor) used for manipulation of the digital images contained in the digital record file. The IDM 18 includes a memory for storing of the digital record of the customer image order.

The apparatus 10 further includes a supply roll 20 containing a web of photosensitive media 23, which in the present invention comprises photographic paper. A cutting mechanism 25 is provided for cutting the web of photosensitive media into individual cut sheets. The mechanism 25 may cut the web into sheets having any desired lengths. Appropriate transport mechanisms, not shown, are provided for advancing of the cut sheets in the direction indicated by arrow 26 along processing path 27 through apparatus 10. In particular, the cut sheets are transported from cutting mechanism 25 to an exposure gate 28 whereby a digital printer 24 exposes the individual images of the customer image order onto individual cut sheets, respectively, as the pass exposure gate 28. In the particular embodiment illustrated, the digital printer 24 is a MLVA (Micro Light Valve Array) printer which scans a light containing image data onto cut sheets as they moves in the direction indicated by arrow 26 past exposure gate 28. Since printer 24 is a digital printer and the cutting mechanism 25 may cut the web of photosensitive media 23 into any desired length cut sheets, the images produced on cut sheets may be provided in a variety of different format sizes being constrained only by the printing capabilities of the printer 24 and width of the web of the photosensitive media 23. It is also to be understood that the printer 24 may be any appropriate digital printer, for example, a CRT printer, LED printer, LCD printer, laser printer or other type of digital printer that can print onto a photosensitive media. In the embodiment illustrated, the web of photosensitive media 23 comprises photographic paper, however, the media may comprise other media capable of being printed on by a digital printer. In the embodiment illustrated, the web of photosensitive media is first cut into individual cut sheets prior to printing, the present invention is not so limited. The digital images may be first printed on the web of photosensitive media 23 which at some later time before or after processing, is to be cut into individual cut sheets forming individual prints, each print being representative of a print of a single customer image.

As is typical with minilabs, the apparatus 10 is further provided with a processing section 30 wherein the cut sheets, after leaving exposure gate 28, are passed therethrough for development as is customarily done in such devices. In the particular embodiment illustrated, the cut sheets are passed through a developer station 31 containing a developer solution, a bleach/fix station 33 containing a bleach/fix solution, a plurality of wash stations 35, 37 and 39 each containing a washing solution, and through a dryer section 40 for drying of the photosensitive media. The individual prints of the images are then forwarded to sorter 42 wherein the prints for each customer image order are collated into separate bins 44a-f, each bin preferably receiving an individual customer image order. It is to be understood that any desired number of bins 44 may be provided as appropriate for the apparatus 10 and sorted in accordance with any desired sorting criteria.

As is customary, a CPU (computer) 45, is provided for controlling operation of the apparatus 10 and its various components. A user/operator interface 46, which includes a viewing screen 47, is also provided, for allowing an operator to enter instructions for operation of the apparatus 10 and monitor operation of the apparatus as is customarily done.

An appropriate computer printing program is provided for controlling operation of the IDM 18. The computer program is provided in an appropriate format which allows loading of the program into the apparatus 10 which causes the IDM 18 to perform the required steps. In particular, the computer program is designed so that the IDM 18 will first obtain and store a complete customer image order prior to printing. Appropriate enhancement algorithms, which have been preprogrammed into IDM 18, are applied to the customer image order so as to improve the overall aesthetic appearance of the images when printed. It is to be understood that any desired enhancements and/or corrections may be applied to the images. For example, but not by way of limitation, the following are a few of the enhancements that may be applied: contrast adjustment, red eye removal, color balance, removal of dust marks or scratches and sharpness adjustments. In addition, custom corrections, such as crop and zoom, can be programmed or manually entered into the digital printer. After the stored digital images are enhanced, they are forwarded to the printer 24 for printing.

In order to better understand the operation of the present invention, a description of its operation will now be discussed. A customer image order is provided and forwarded to the photofinisher. This typically takes the form of an undeveloped or developed roll of film which is sent to the photofinisher. If the film is undeveloped, the photofinisher will develop the film as is customarily done in the art. Once the film has been developed, it is passed onto apparatus 10 wherein the images of the customer image order are scanned and forwarded onto the IDM 18. Appropriate image enhancement software programs, as previously discussed, are provided in the IDM 18 for analyzing the images and providing appropriate enhancements/corrections automatically to the images. After the appropriate image enhancements have been made to the images of the customer orders, a rating as to the amount of enhancement or correction made to each image is obtained. For example, a single rating point may be given for each enhancement made. Thus, if an image is only enhanced by one feature such as sharpness, then it would be given a rating of one point, if two enhancements were applied to the image then the image would receive a rating of two points. Additionally, the rating assigned may depend on the type or degree of any one enhancement. Therefore, if an extensive amount of an enhancement or the enhancement of a particularly difficult type is applied, then it may be given a higher rating, for example two points. Therefore, each image obtains a rating in accordance with the amount of correction or enhancement that was made to that image. The greater the enhancement, the higher the rating. It is to be understood that the rating system may be constructed in any desired manner considered appropriate. The image which has reached a predetermined amount of enhancement is identified and tagged for printing as a comparison print. Preferably the image having the highest rating is printed as this would illustrate the most improvement. All the images of the customer image order are sent to printer 24 for printing. A comparison print of the tagged image is preferably printed adjacent the printed image which incorporates corrections. In this way, the consumer can easily compare the benefits that the enhancement has made to the image as originally captured.

Figure 2:
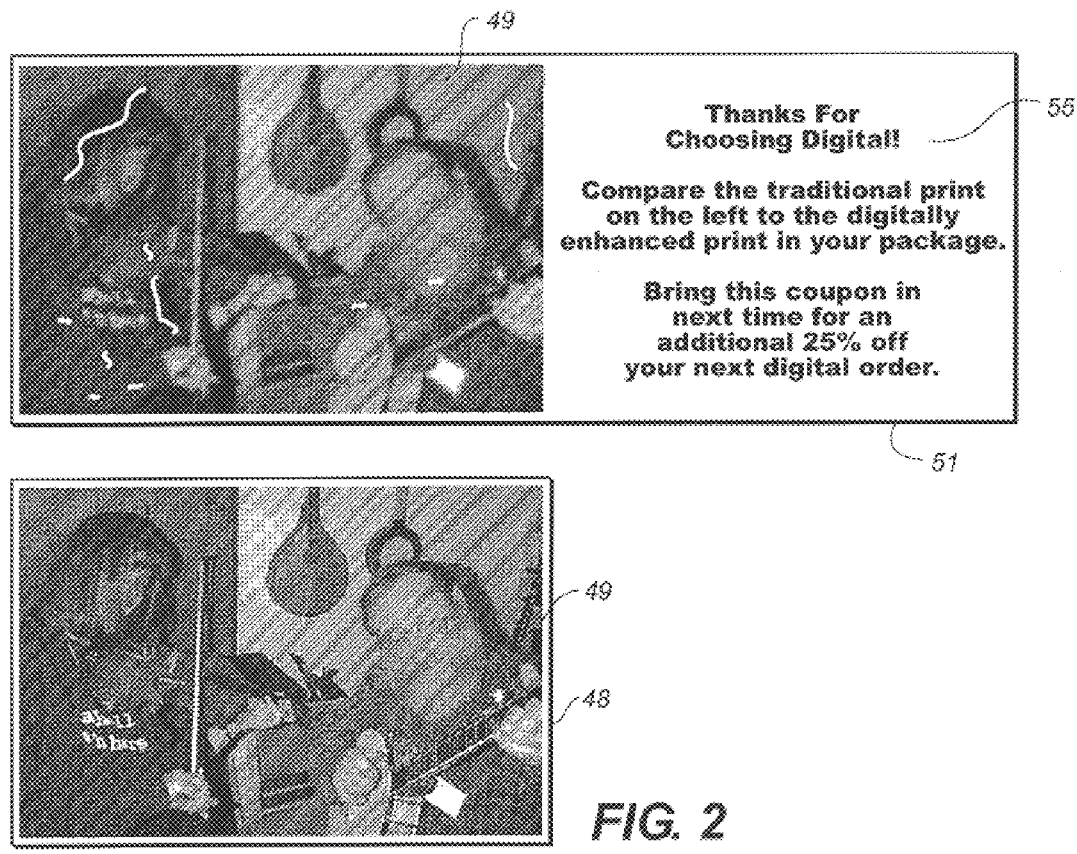
FIG. 2 illustrates two prints of the same image, one of which is a comparison print of the other.
Figure 3:
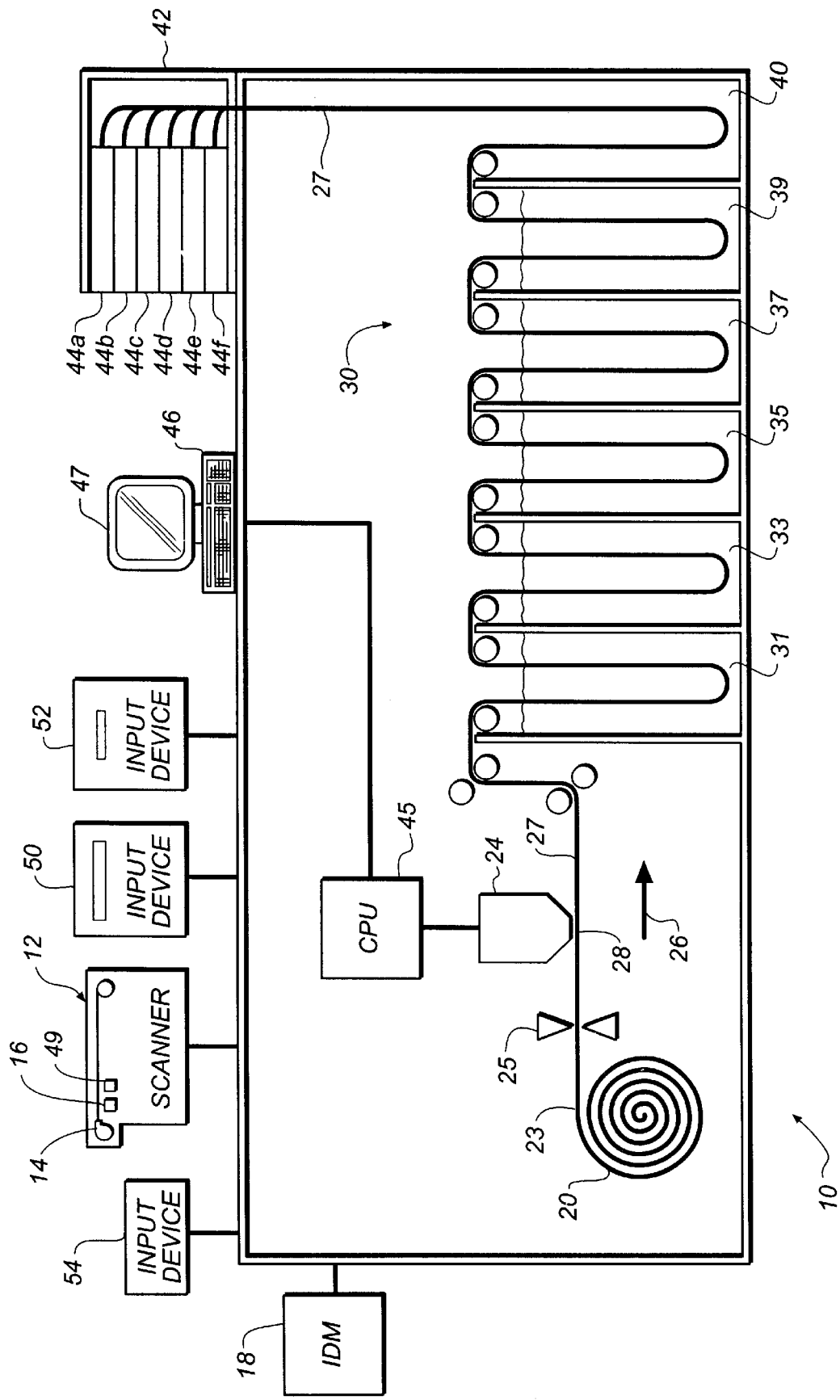
FIG. 3 is a schematic view of a modified system made in accordance with the present invention.

Referring to FIG. 2, there is illustrated a print 48 made in accordance with the normal printing algorithm of an image 49 and a comparison print 51 of image 49 made without the enhancement. While improvement in color balance, scene contrast cannot be adequately shown by these drawings. Improvement in sharpness and scratch removal can be observed. In the embodiment illustrated, appropriate information (text) 55 can be provided directly on the comparison print 54 telling the consumer that this is a comparison print made without any enhancements provided by the enhancement algorithms provided in the printer. As can be seen, text 55 may be placed on the comparison print 54 advising the customer of the benefits provided by this photofinishing source. As previously discussed, the comparison print is preferably placed adjacent to the enhanced print 48, thereby providing a quick and easy comparison, however, the comparison print may be located at any desired place in the order. The text may be placed on the comparison print 51 or adjacent thereto and may include any desired statement by the operator, photofinisher, or retailer.

In an alternate embodiment of the present invention, instead of subjecting all of the images to the enhancement algorithms, it may be desirable that certain enhancements are applied only in premium printing service. Therefore, in this situation, images of the customer image order are reviewed to see which ones would most benefit from applying the enhancements to the image. The same system for rating the amount of enhancement could be used for rating of the images. The entire customer image order would be printed in its normal manner without the enhancements, however, the image which would have a predetermined amount of enhancement, preferably the image having most benefit from applying the enhancements, could be printed as a comparison print adjacent the normal print. Text, as previously discussed, may be provided on the comparison print stating that it is a comparison print which has incorporated certain enhancement features which could have been provided to the entire order. A certificate or discount coupon could be printed or otherwise provided with the returned prints to the consumer stating how the enhancement can be obtained in a reorder.

In the preferred embodiment illustrated, the enhancements to the images are applied automatically, however, an appropriate display screen on apparatus 10 may be provided for previewing of the images by an operator who can make custom enhancements/modifications to the images which can then be printed as a comparison print for forwarding to the consumer for providing of a comparison illustrating the benefits of ordering certain enhancements on this or any other image.

In the embodiments discussed above, the images for printing are obtained by scanning a developed roll of photosensitive film. However, the present invention is not so limited. As illustrated in FIG. 1, image data and customer image order may be obtained from a variety of different sources whereby a customer image order may be submitted for printing, including providing of information of where the printed images are to be forwarded. For example, image input devices 50, 52, 54 may be provided wherein input device 50 may provide the images supplied on a CD, device 52 can be used to obtain images provided on computer disk, and a communication modem 54 may be provided to receive images over the internet, or from any other source that can forward digital images. Other digital input devices, such as a digital camera, may be used.

In the embodiment illustrated, the apparatus 10 does the printing, however, the present invention is not so limited. For example, the printing can be forwarded onto a different device for storage, printing and/or display. For example, the IDM 18 may forward the images through modem 54 to a customer or other device for providing and/or storing images.

In the embodiment illustrated in FIG. 1, the individual components are illustrated as a single apparatus 10. However, the present invention is not so limited. Referring to FIG. 2, there is illustrated a modified form of the present invention, like numerals indicating like parts and operation as previously discussed. In this embodiment, the scanner 12, IDM 18 and devices 50, 52, 54 are shown as separate individual components from the apparatus 10, which is used for printing of the images onto a photosensitive media. The operation and function of all the elements are the same except that individual elements are discrete elements that can be separate from each other and connected by appropriate communication lines as is well known to those of ordinary skill in the art.

In the embodiment illustrated, the processing of the photosensitive media is done by the apparatus 10. However, the present invention is not so limited. For example, the images may be printed on the web of photosensitive material 23 and forwarded in web form to a processor wherein the images are developed after which the developed web is forwarded onto a finishing station wherein the web is cut into individual prints and sorted by customer image order.

It is to be understood that various other changes and modifications may be made without departing from the scope of the present invention. The present invention being defined by the following claims.

PARTS LIST 10 apparatus
12 scanner
14 developed film
16 sensor
18 image data manager (IDM)
20 supply roll
23 photosensitive media
24 digital printer
25 cutting mechanism
26 arrow
27 processing path
28 exposure gate
30 processing station
31 developer station
33 bleach/fix station
35 wash station
36 sorter
37 wash station
39 wash station
40 dryer section
42 sorter
44a–f bins
45 CPU (computer)
46 user/operator interface
47 viewing screen
48 print
49 image
51 print
50 input device
52 input device
54 input device
55 text

What is claimed is:

1. A method of printing a customer image order, each containing a plurality of images, comprising the steps of:
    obtaining a digital record of a customer order containing a plurality of images;
    digitally enhancing at least one of said plurality of images;
    determining an amount of digital enhancement made to each of said enhanced images
    providing a rating to each enhanced image proportional to the amount of digital enhancement made to the image;
    selecting at least one of said enhanced images which has a rating greater than a predetermined value for printing as an enhanced image print;
    printing said at least one selected image with the digital enhancement; and
    printing at least one of said images without any of said enhancements so as to provide a comparison image print illustrating how the selected image would have been printed without the enhancements.

2. A method according to claim 1 wherein said comparison image print is printed adjacent to said enhanced image print.

3. A method according to claim 1 wherein said comparison image print includes text thereon and/or adjacent thereto.

4. A method according to claim 3 wherein said text identifies that the comparison image print was generated without any enhancements.

5. A method according to claim 1 wherein said selected image is the image having the highest rating.

6. A method according to claim 1 wherein all of said images are analyzed and enhanced as determined by enhancement algorithms.

7. A method according to claim 1 wherein said digital record is obtained by scanning a strip of photosensitive material.

8. A method according to claim 7 wherein said photosensitive material comprises photographic film.

9. A method according to claim 1 wherein said digital record is obtained from a modem, a CD, or computer disc.

10. An apparatus for printing customer image orders, each containing a plurality of images, comprising:
    a device for obtaining a digital record containing a plurality of images of a customer image order;
    a memory for at least temporarily storing said plurality of images;
    means for digitally enhancing at least one of said plurality of images;
    means for determining an amount of enhancement made to each of said enhanced images and providing a rating based on the amount of enhancement provided; and
    a digital printer for printing said plurality of images which have been digitally enhanced and for printing a comparison print of the image having a predetermined amount of enhancement rating without the enhancement.

11. An apparatus according to claim 10 wherein said digital record is obtained by scanning a strip of photosensitive material containing said plurality of images for said customer image order.

12. An apparatus according to claim 10 wherein said predetermined amount of enhancement comprises the image having the highest enhancement rated image enhancement.

13. An apparatus according to claim 10 wherein said digital printer provides text on or adjacent the comparison print.

14. An apparatus according to claim 10 wherein said comparison print is printed adjacent to said enhanced image print.

15. An apparatus according to claim 13 wherein said text identifies that the comparison print was generated without any enhancements.

16. An apparatus according to claim 10 wherein all of said images are analyzed and enhanced as determined by enhancement algorithms.

17. An apparatus according to claim 10 wherein said photosensitive material comprises photographic film.

18. An apparatus according to claim 10 wherein said digital record is obtained from a modem, a CD, or computer disc.

19. A computer program product comprising a computer readable storage medium having a computer program stored thereon which when loaded into a computer, causes the computer to perform the steps of:
    analyzing images for certain predetermined characteristics and then automatically digitally enhancing these features based on a predetermined criteria;
    forwarding the enhanced images to a printer for printing;
    determining an enhancement rating for each of said images of said customer order, said enhancement rating being based on an amount of enhancement made to the enhanced images; and
    printing the enhanced image.

20. A computer program according to claim 19 wherein said predetermined amount of enhancement comprises the image having the highest rate of enhancements.

21. A method of printing a customer image order, each containing a plurality of images, comprising the steps of:
   obtaining a digital record of a customer order containing a plurality of images;
   determining an amount of enhancement that can be made to each of said images and providing a rating proportional to the amount of enhancement that can be made;
   printing said images as originally provided as non-enhanced image prints; and
   printing at least one image of said customer order with enhancements so as to provide a comparison print illustrating how the image would have been printed with the enhancements, said at least one image with enhancements having a rating which is greater than a predetermined value.

22. A method according to claim 21 wherein said comparison print is printed adjacent to said non-enhanced image print.

23. A method according to claim 21 wherein text is provided adjacent to or on said comparison print.

24. A method according to claim 21 wherein said text identifies that the comparison print was generated with enhancements.

25. A method according to claim 21 wherein said comparison print comprises the image having the highest rating.

26. A method according to claim 21 wherein said digital record is obtained by scanning a strip of photosensitive material.

27. A method according to claim 26 wherein said photosensitive material comprises photographic film.

28. A method according to claim 26 wherein said digital record is obtained from a modem, a CD, or computer disc.

29. An apparatus for printing customer image orders, each containing a plurality of images, the apparatus comprising:
   a device for obtaining a digital record of a plurality of images for a customer image order;
   a memory for at least temporarily storing said plurality of images;
   means for determining an amount of enhancement that can be made to each of said images and providing a rating based on the amount of enhancement that can be made; and
   a digital printer for printing said plurality of images as originally provided and for printing a comparison print of an image from said plurality of images with enhancements which has a rating of a predetermined amount.

30. An apparatus according to claim 29 wherein said digital printer provides text adjacent to or on the comparison print.

31. An apparatus according to claim 29 wherein said digital record is obtained by scanning a strip of photosensitive material containing said plurality of images for said customer image order.

32. An apparatus according to claim 29 wherein said predetermined amount of enhancement comprises the image having the highest enhancement rated image enhancement.

33. An apparatus according to claim 29 wherein said comparison print is printed adjacent to said image without enhancement.

34. An apparatus according to claim 30 wherein said text identifies that the comparison print was generated with enhancements.

35. An apparatus according to claim 31 wherein said photosensitive material comprises photographic film.

36. An apparatus according to claim 29 wherein said digital record is obtained from a modem, a CD, or computer disc.

37. A computer program product, comprising a computer readable storage medium having a computer program stored thereon which when loaded into a computer, causes the computer to perform the steps of:
   analyzing digital images in a customer image order to determine which image would most benefit from applying digital enhancing algorithms and rating each as to the amount of enhancement that can be made;
   forwarding the images as originally provided to a printer for printing; and
   printing a comparison print of one of said plurality of images with enhancement, said comparison print having a rating of a predetermined amount.

38. A computer program according to claim 37 wherein said predetermined amount comprises the image having the most enhancements.

* * * * *